United States Patent
Adams et al.

(10) Patent No.: US 6,719,361 B1
(45) Date of Patent: Apr. 13, 2004

(54) TRUCK SLEEPER CAB TO DAY CAB CONVERSION KIT ASSEMBLY

(75) Inventors: David Scott Adams, South Macungie, PA (US); James Thomas Wunderlich, Fogelsville, PA (US); Donald Michael Reed, Emmaus, PA (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 10/282,059

(22) Filed: Oct. 29, 2002

(51) Int. Cl.[7] .............................................. B62D 33/06
(52) U.S. Cl. ............................ 296/190.01; 296/190.11; 296/191
(58) Field of Search ................... 296/190.01, 190.02, 296/190.08, 190.11, 191; 180/89.12; 29/401.1, 426.1, 428

(56) References Cited

U.S. PATENT DOCUMENTS

| | | | |
|---|---|---|---|
| 3,551,014 A | * 12/1970 | Tamruchi | 52/416 |
| 4,050,735 A | * 9/1977 | Molnar | 296/102 |
| 4,605,257 A | 8/1986 | Lang et al. | |
| 4,887,859 A | 12/1989 | Aper | |
| 5,310,239 A | 5/1994 | Koske et al. | |
| 5,560,673 A | 10/1996 | Angelo | |
| 5,735,568 A | 4/1998 | Arnold | |
| 6,076,884 A | 6/2000 | Osman | |
| 6,178,612 B1 | 1/2001 | Gernstein | |
| 6,557,230 B1 | * 5/2003 | Gernstein | 29/401.1 |
| 2003/0025357 A1 | * 2/2003 | Fischer et al. | 296/190.08 |

OTHER PUBLICATIONS

Callister, Jr., W., Materials Science and Engineering: An Introduction, John Wiley & Sons, Inc., New York, 1994, pp. 366–368 and 531–532.*

* cited by examiner

*Primary Examiner*—D. Glenn Dayoan
*Assistant Examiner*—Patricia L. Engle
(74) *Attorney, Agent, or Firm*—Rothwell, Figg, Ernst & Manbeck, PC

(57) ABSTRACT

A conversion kit assembly for converting a sleeper truck cab with a modular sleeper/cab into a day cab includes a sleeper truck cab including a rear sill, two laterally spaced walls, and a roof, with each of the walls having a B-pillar assembly at a rearward end of the sleeper truck cab. The B-pillar assemblies are coupled together at their upper ends by the roof, and at their lower ends by a lower member such as a lower panel or a rear sill such that the rearward end of the sleeper truck cab is substantially square. The sleeper truck cab further has a plurality of attachment points at the rearward end for attaching the modular sleeper. A first plurality of fasteners, which connect the modular sleeper to the sleeper truck cab, are removed. The modular sleeper is removed from the sleeper truck cab thereby creating a rearward opening at rearward end of modular truck cab. A closeoff panel assembly comprising a frame sub-assembly and an outer panel welded to the frame sub-assembly is then attached to the sleeper truck cab by fasteners disposed at locations corresponding to at least some of the plurality of attachment points. The closeoff panel assembly is provided to close the rearward opening created by removal of the modular sleeper from the sleeper truck cab. First and second reinforcement members connect the closeoff panel assembly to the B-pillar assemblies of the sleeper truck cab, and third and fourth reinforcement members connect the closeoff panel assembly to the lower panel or rear sill of the sleeper truck cab, to distribute loads from the closeoff panel to the sleeper truck cab, and thence to the vehicle chassis. A load is distributed from the closeoff panel assembly to the sleeper truck cab with the reinforcement members. A gasket is also used between the sleeper truck cab and the closeoff panel assembly to seal moisture from the cab.

23 Claims, 7 Drawing Sheets

TRUCK SLEEPER CAB TO DAY CAB CONVERSION KIT ASSEMBLY

BACKGROUND OF THE INVENTION

1. Field of the Invention:

The present invention relates to conversion kits for truck cabs, and more particularly, to a conversion kit for converting a modular truck sleeper/cab into a day cab. A modular truck sleeper/cab is defined as a sleeper truck cab joined to a modular sleeper.

2. Description of the Related Art:

Over-the-road, or long-haul, trucks are often equipped with sleeper cabs. Sleeper cabs allow truck drivers who are on the road for several days at a time to take breaks at appropriate times. After long-haul trucks have served their useful lives on long hauls, they may be resold.

Demand for used short haul delivery trucks, or day trucks, tends to be more robust than that for used long-haul trucks. Prices for used day trucks consequently tend to be higher than prices for used long-haul trucks, other things being equal. The drivers of day trucks rarely spend more than one day driving them, so a sleeper may not be particularly useful to them. Day trucks thus generally have only 'day cabs', without a sleeper. Thus it may be desirable to be able to remove a sleeper from a long haul truck before the truck is resold, to take advantage of the potentially higher resale demand.

The design of the cab and sleeper influences the ease with which such long haul trucks may be converted to day trucks. Sleepers may be designed to be an integral part of the cab, or they may be designed to be added to the cab while the truck is assembled. If the sleeper is an integral part of the cab, it may be more difficult to remove when the truck is to be resold than, e.g. a modular sleeper/cab design.

Sleepers that are designed to be added to a cab during assembly or after sale are called 'modular' sleepers. An interface between a sleeper truck cab and a modular sleeper may present a weak point in such a structure. An integral sleeper, on the other hand, may be potentially stiffer than a comparable modular sleeper/cab design.

The potentially greater stiffness of an integral sleeper relative to a modular sleeper arises from the opportunity to design the cab and sleeper together as a unibody or monocoque structure, or to incorporate structural members such as risers, stringers, or frames that connect the sleeper to the cab. These structural members may cross the interface between the cab and the sleeper, transmitting loads from one to the other. There may thus be substantially no interface between the cab and the sleeper with respect to stiffness and rigidity.

Modular sleepers, in contrast, are generally attached to the rear of a separate cab. Modular sleepers offer the advantage of being able to be interchanged to suit various needs for different sizes and styles of sleepers in the marketplace. The ability to attach various sleepers to a cab, however, requires a common interface between the cab and the different sleepers.

In current engineering practice, a modular sleeper cab design may be a system comprised of a sleeper cab, a sleeper and a frame of a truck. The sleeper cab, sleeper, and truck frame are customarily interdependent upon each other to maintain structural integrity of the finished unit. Removal of the sleeper results in an incomplete system and hence the structural integrity of the system may no longer be maintained.

Modular truck sleeper cabs may be converted to day cabs by removing the modular sleeper and covering the resulting opening with a closeoff panel. Removing the sleeper leaves an opening in the rear of the cab formed by the rear sill, the walls, including the B-pillars, and the roof. The opening may be roughly square, and hence an incomplete system cab may be relatively weak in some modes.

Such a structure may not protect an occupant very well in the event of a crash. Such a structure may also vibrate in response to forcing functions such as, e.g. the engine's combustion sequences and road inputs, such as tire forces. The vibration may then be transmitted to the driver without impedance. Excessive vibration can result in driver fatigue, a loss of driver awareness, and potentially greater risks of accidents.

Vibration may be characterized by repetitive reversals of motion on the part of a structure. The higher a frequency of vibration, the greater the number of reversals per unit time. A structure may be reinforced to reduce its response to vibration.

Reinforcements add mass as well as stiffness. Since the inertia associated with added mass resists changes in direction, masses tend to behave like low-pass filters for vibration. That is, a mass tends to transmit low-frequency vibration while impeding higher frequencies. Stiffness, on the other hand, acts like a high-pass filter, impeding lower frequencies and transmitting higher frequencies.

Reinforcements can, therefore, be designed to ameliorate the particular frequencies of vibrations a cab and closeoff panel are likely to experience. Combustion and road inputs, e.g. have relatively low frequencies. The frequency at which combustion events occur in a four-cycle, six-cylinder engine running at 2000 rpm e.g., is only about 100 Hz. Reinforcements to truck cabs should therefore be designed to add proportionately more stiffness than mass.

Reinforcements that aren't optimized for the particular frequencies a structure is likely to experience, on the other hand, may add mass unnecessarily. Reinforcements that, e.g. add more mass than stiffness in an environment characterized by low frequency vibration are less than optimal. Adding weight without a commensurate gain in stiffness also reduces fuel economy and drivability. It would be desirable if reinforcements applied to a day cab conversion were optimized to add maximum stiffness without increasing unduly the mass of the vehicle.

Since day cabs are shorter than cabs with sleepers, whether integral or modular, those produced originally as day cabs, without an opening in back, are often stiffer than either. Even though closeoff panels may be bolted or riveted to the perimeter of the opening to convert the modular truck sleeper cab to a day cab, such closeoff panels have not heretofore offered structural rigidity equal to a truck cab that was built originally as a day cab, or to trucks where the sleeper cab, sleeper and frame were part of an interdependent system. It would be desirable if a converted day cab could have stiffness and rigidity comparable to a day cab produced originally as a day cab.

Furthermore, the truck manufacturer may be able to predict, e.g., that a significant portion of modular truck sleeper/cabs that were sold originally with modular sleepers attached will eventually be converted to day cabs. This presents an opportunity for the designer of a modular truck sleeper/cab to design a closeoff panel to fit their particular sleeper truck cab, along with an array of modular sleepers. This would allow the closeoff panel to be optimized for the particular sleeper truck cab. This would also allow a designer to plan a closeoff panel to take advantage of the existing fastener scheme, dispensing with the need to drill any new holes, or keeping new holes to an absolute minimum.

The interior of such a closeoff panel could also be trimmed to fit and match the truck cab, resulting in a converted day cab that had the appearance of a conventional day cab. This would make the converted day cab more attractive, potentially raising the value of the truck, since attractive, presentable products may be more desirable than unattractive, slovenly ones. It would be desirable, therefore, for a sleeper truck cab conversion kit to be designed and optimized with the sleeper truck cab and modular sleeper themselves.

Reinforcing the closeoff panel has, in the past, meant securing the closeoff panel with respect to the opening. The reinforcement members were directed primarily toward, e.g. keeping the closeoff panel flat, or simply as a method of attachment. Such reinforcements thus generally took the shape of, e.g. gussets that did little to carry loads from the closeoff panel to the day cab itself, or to the vehicle frame. Furthermore, gussets are, by their nature, added at the corners of the opening in the rear of the cab.

Gussets may consequently add mass at the perimeter of the closeoff panel without adding much stiffness, potentially exacerbating vibration in the manner of a dipole. It would be desirable if the closeoff panels were reinforced in a manner that made the closeoff panel an integral structural part of the day cab conversion. Such reinforcements may, e.g. distribute loads from the closeoff panel to the rest of the day cab and the vehicle frame.

Furthermore, occupant protection is a top concern of truck manufacturers. Vehicles are often designed with 'crush zones' around the occupant to absorb the energy of a crash, while the occupied area of the vehicle stays relatively intact. The occupied area, namely, the cab, should thus be stiff relative to the rest of the vehicle, and particularly relative to the crush zones. Since day cab conversions have heretofore been relatively flimsy, day cab conversions may not have offered the level of occupant protection afforded by, e.g. a day cab that was originally designed as a day cab. It would be desirable if a day cab conversion were optimized to take maximum advantage of a vehicle's crush zones, by being part of a system that controls the dissipation of energy incurred during a crash.

SUMMARY

In a first embodiment, the invention is a conversion kit assembly for converting a modular truck sleeper/cab including a sleeper truck cab and a modular sleeper into a day cab. The sleeper truck cab includes a floor having a rear sill, two laterally spaced walls, and a roof, with each of the walls having a B-pillar at a rearward end of the sleeper truck cab. The B-pillars are coupled together at their upper ends by the roof and their lower ends by a lower member such as a lower panel or a rear sill, such that the rearward end of the sleeper truck cab may be substantially square. The sleeper truck cab further has a plurality of attachment points at the rearward end for attaching the modular sleeper.

The conversion kit includes a closeoff panel assembly comprising a frame sub-assembly and an outer panel welded to the frame, the closeoff panel assembly being attached to the sleeper truck cab by fasteners disposed at locations corresponding to at least some of a plurality of existing attachment points. First and second reinforcement members connect the closeoff panel assembly to the B-pillars of the sleeper truck cab, and third and fourth reinforcement members connect the closeoff panel assembly to the lower member of the sleeper truck cab, to distribute loads from the closeoff panel to the sleeper truck cab, and thence to the vehicle chassis.

In a second embodiment, the invention is a method of converting a modular truck sleeper/cab to a day cab. A modular truck sleeper/cab having a modular sleeper fastened to a rearward end of a sleeper truck cab described previously in the first embodiment may be provided with a first plurality of fasteners at a plurality of predetermined locations. The first plurality of fasteners, which connects the modular sleeper to the sleeper truck cab, are removed. The modular sleeper may be removed from the sleeper truck cab thereby creating a rearward opening at rearward end of sleeper truck cab. A closeoff panel assembly may be provided to close the rearward opening created by removal of the modular sleeper from the sleeper truck cab. The closeoff panel assembly may be fastened to the sleeper truck cab with a second plurality of fasteners in the plurality of predetermined locations to close the rearward opening whereby the sleeper truck cab has the appearance of a day cab. The closeoff panel assembly may be connected to B-pillars of the sleeper truck cab with first and second reinforcement members. The closeoff panel assembly may be connected to a lower member such as a lower panel or a rear sill of the sleeper truck cab with third and fourth reinforcement members. Loads are distributed from the closeoff panel assembly to the sleeper truck cab by the reinforcement members.

DETAILED DESCRIPTION OF THE PREFERRED EMBODIMENTS

Figure 1:
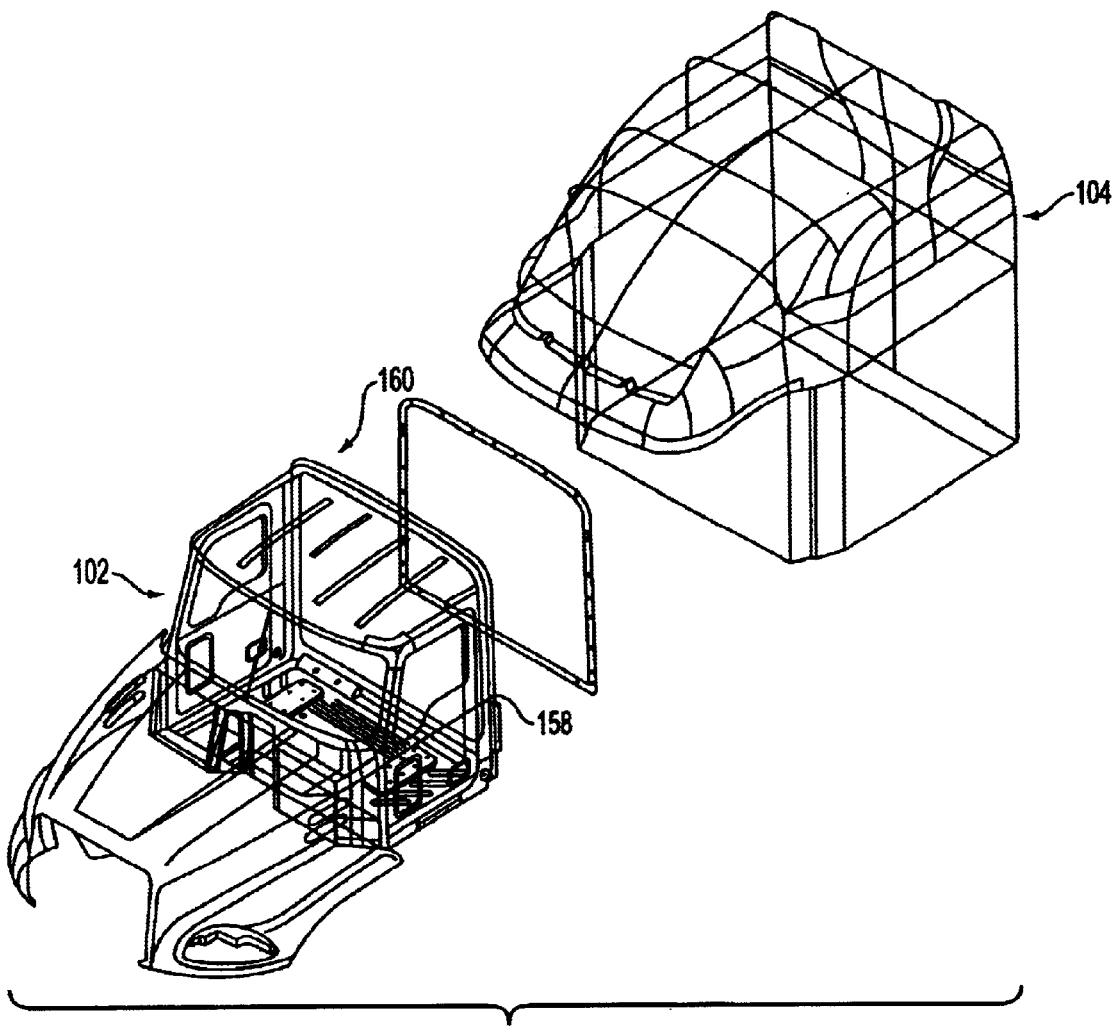
FIG. 1 shows an exploded view of a modular truck sleeper/cab according to an embodiment of the invention.
Figure 2:
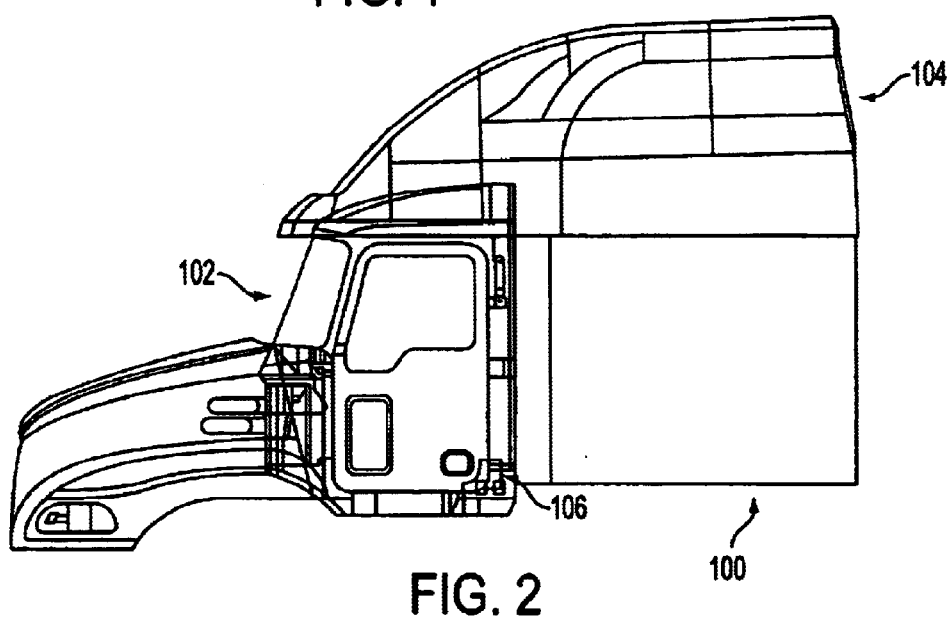
FIG. 2 shows a side view of the modular truck sleeper/cab according to the embodiment shown in FIG. 1.

In FIGS. 1 and 2 is shown a modular sleeper truck sleeper/cab 100 ready to be converted to a day cab according to a first embodiment of the invention. The modular truck sleeper/cab 100 includes a sleeper truck cab 102 connected to a modular sleeper 104. Modular truck sleeper/cab 100 may be, e.g. mounted on a truck that has served most of its useful life hauling cargo over-the-road. The owner may now desire to sell the truck into the used truck market, and knows that trucks with day cabs command higher prices as used trucks than those with sleeper cabs. The owner may, therefore, wish to convert the cab to a day cab before selling the truck.

Figure 3:
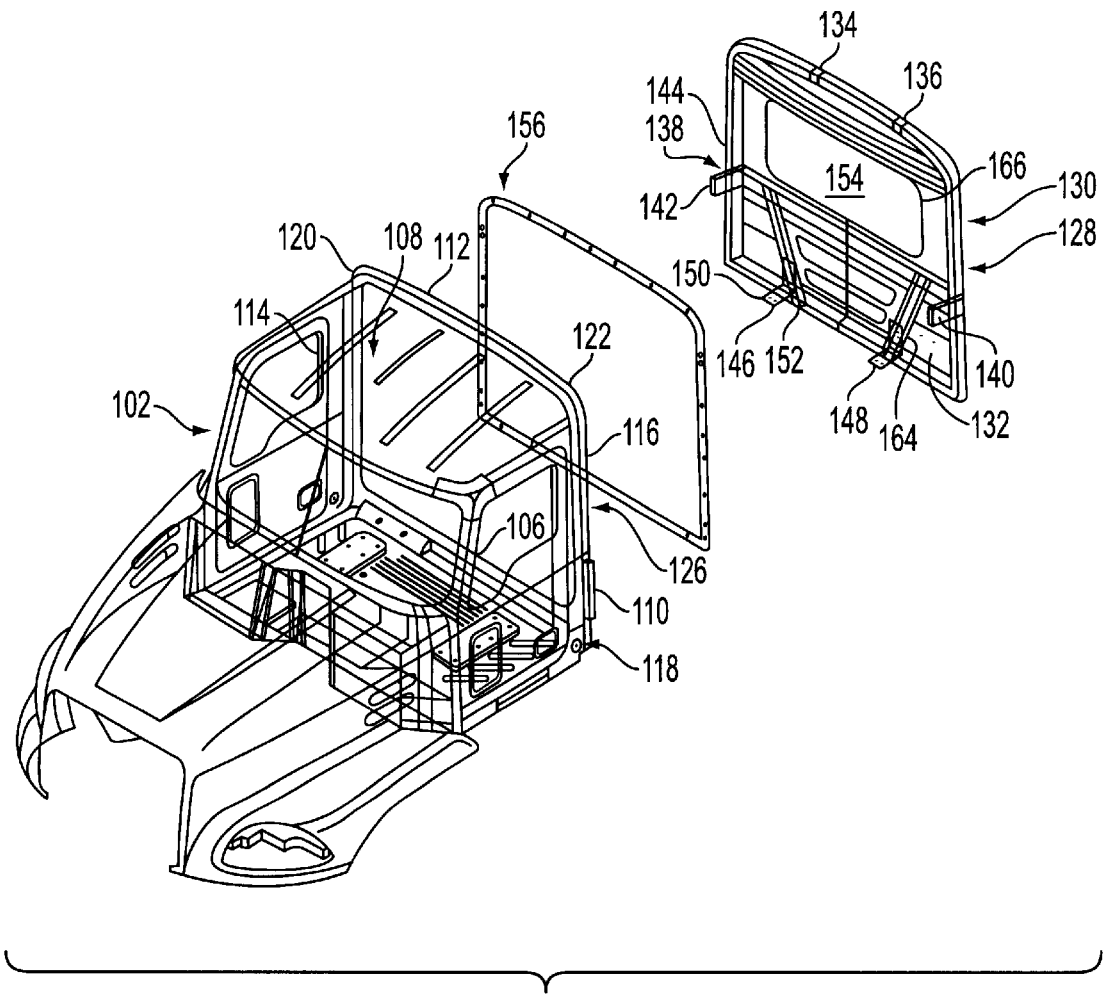
FIG. 3 shows an exploded view of a truck cab according to the embodiment shown in FIG. 1.
Figure 4:
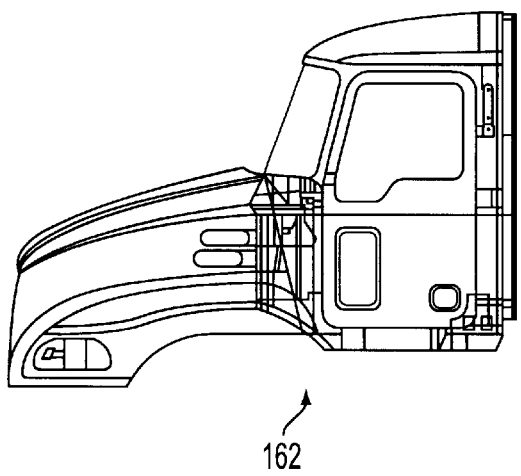
FIG. 4 shows a side view of a truck cab according to the embodiment shown in FIG. 1.

In FIGS. 3 and 4 is shown sleeper truck cab 102 in the process of being converted to a day cab 162 according to a first embodiment of the invention. As may be seen in FIG. 3, modular truck cab 102 includes a floor having a lower member 106, two laterally spaced walls 108, 110, and a roof 112. Lower member 106 may be, e.g. a lower panel or a rear sill. Each of walls 108, 110 includes a B-pillar 114, 116 at a rearward end 118 of modular truck cab 102. B-pillars 114, 116 are further coupled together at their upper ends 120, 122 by roof 112, and at their lower ends by lower member 106, keeping rearward end 118 substantially square. Modular truck cab 102 has a plurality of attachment points 126 at rearward end 118 for attaching modular sleeper 104.

Figure 5:
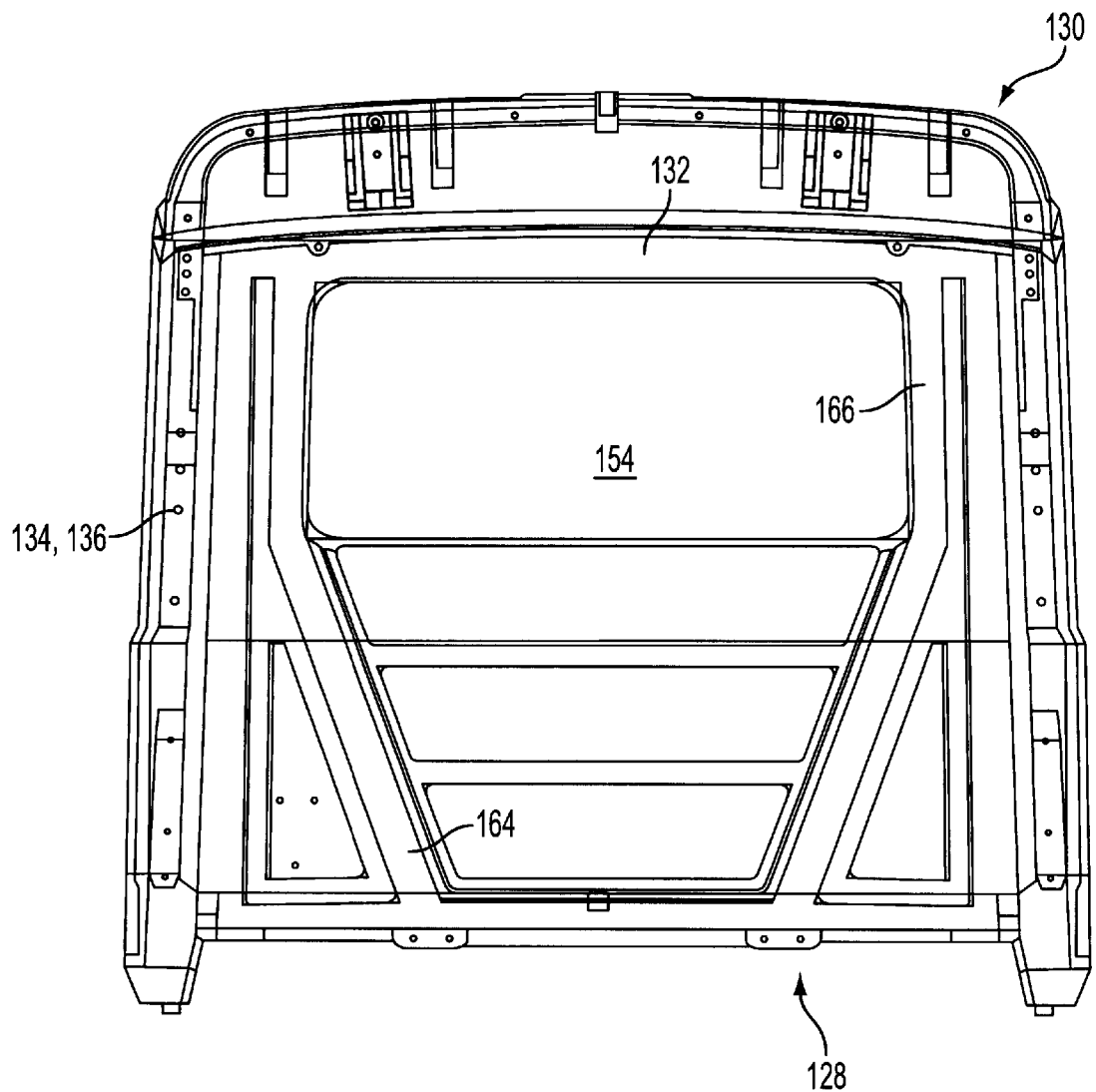
FIG. 5 shows a rear view of a truck cab according to the embodiment shown in FIG. 1.

A closeoff panel assembly 128 is shown in FIG. 5. Closeoff panel assembly 128 may include, e.g. a frame sub-assembly 130 to which an outer panel 132 may be, e.g. welded. Frame sub-assembly 130 may be, e.g. substantially arranged around a perimeter of closeoff panel 128 in both embodiments, with horizontal reinforcements above and below the window opening 154. Frame sub-assembly 130 further includes a diagonal support 164 which may, e.g. have a section such as shown in FIG. 6 that substantially triangulates closeoff panel assembly 128. Closeoff panel assembly 128 may thus resist any tendency sleeper truck cab 102 may have towards parallelogramming while adding optimal mass.

The words 'assembly' and 'sub-assembly' as used herein are meant to include components such as closeoff panels and frames that are formed in one piece such as by, e.g. casting. Use of the words 'assembly' and 'sub-assembly' is thus in no way meant to imply the existence of a plurality of component parts is required.

A rectilinear structure such as sleeper truck cab 102 may be relatively flexible without modular sleeper 104 attached. Outer panel 132 may not add much rigidity by itself since substantially flat panels tend to warp under load. Closeoff panel assembly 128 however, which may be, e.g. a combination of outer panel 132, frame sub-assembly 130 or reinforcements 138 and 140, may transfer loads from sleeper truck cab 102 to the vehicle chassis. Such loads may be due to, e.g. road forces, such as tire vibration, or engine forces, and would otherwise distort the sleeper truck cab 102.

Figure 8A:
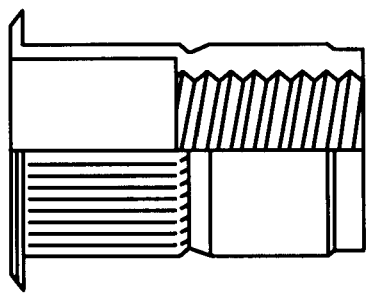
FIGS. 8A–8C show components of fasteners for use with an embodiment of the invention.
Figure 8B:
Figure 8C:
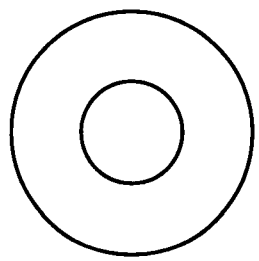

Closeoff panel assembly 128 may be, e.g. attached to sleeper truck cab 102 by fasteners 134 disposed at locations 136 corresponding to at least some of a plurality of attachment points 126. Fasteners 134 may be, e.g. bolts, rivets, clips, or screws, as shown in FIGS. 7A through 7E. Fasteners 134 may include a component such as, e.g. a rivetnut, a washer, a spacer, or a shim, as shown in FIGS. 8A through 8C. Closeoff panel assembly 128 may be designed to accept, e.g. a window in a window opening 154.

Figure 6A:
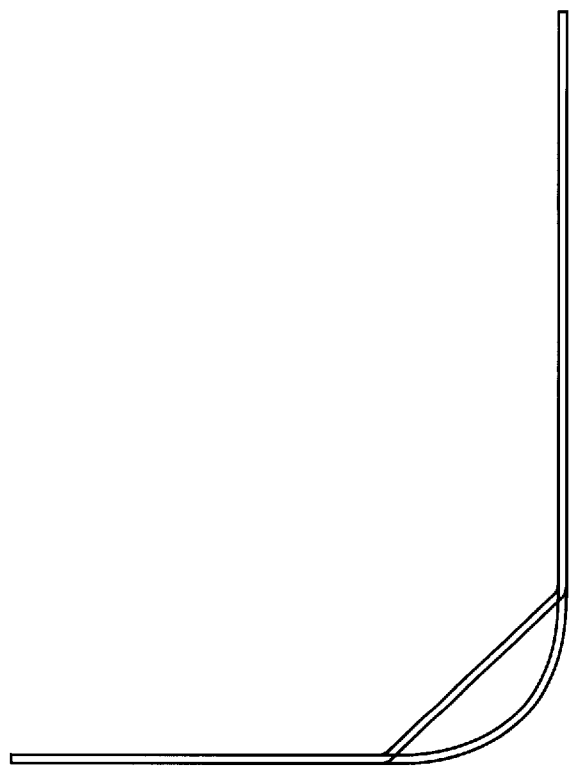
FIGS. 6A–6F show channel sections for use with an embodiment of the invention.
Figure 6B:
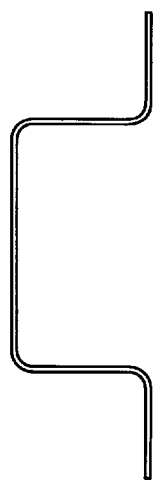
Figure 6C:
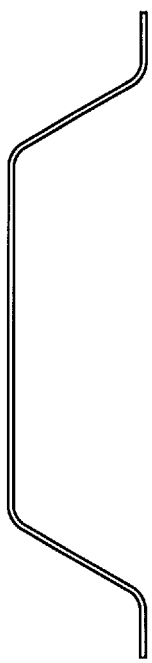
Figure 6D:
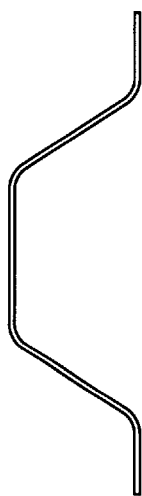
Figure 6E:
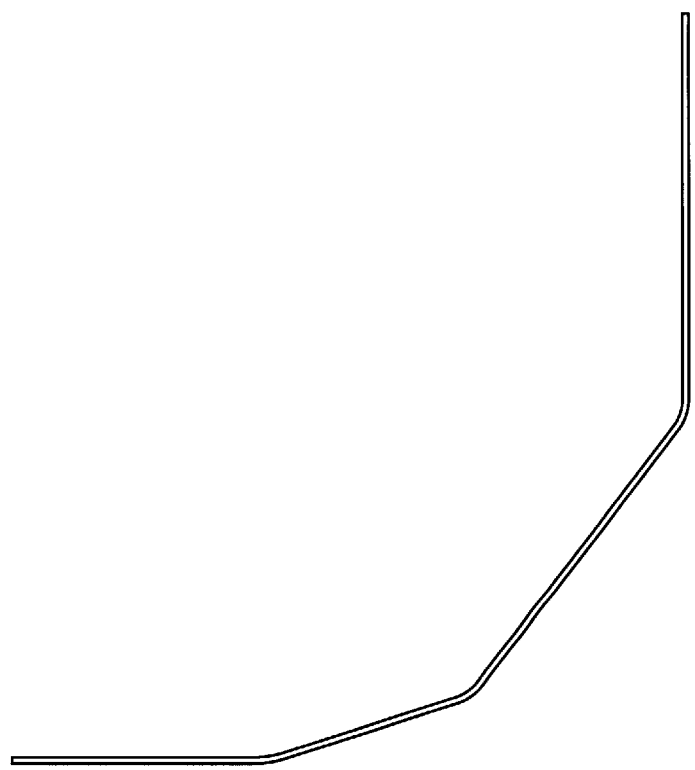
Figure 6F:
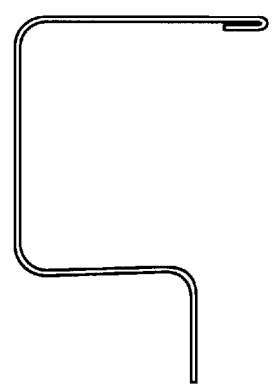
Figure 7A:
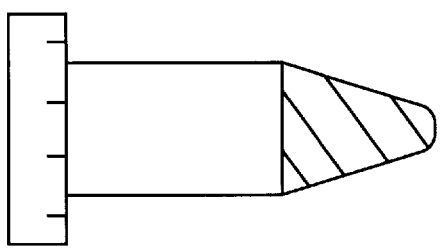
FIGS. 7A–7E show fasteners for use with an embodiment of the invention.
Figure 7B:
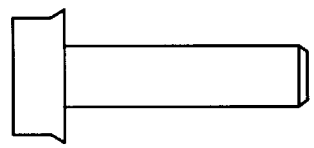
Figure 7C:
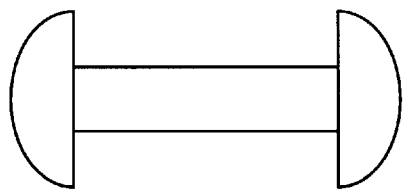
Figure 7D:
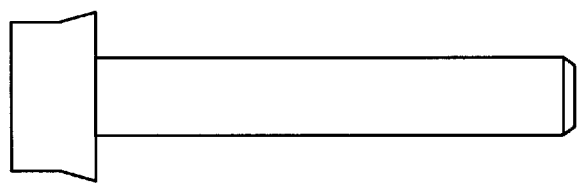
Figure 7E:

Closeoff panel assembly 128 includes first and second reinforcement members 138, 140, each having a first end 142 and a second end 144, to connect closeoff panel assembly 128 to B-pillars 114, 116. Closeoff panel assembly 128 also includes third and fourth reinforcement members 146, 148, each having a first end 150 and a second end 152, to connect closeoff panel assembly 128 to a lower member 106. Reinforcement members 138, 140, 146, 148 may, e.g. distribute loads from closeoff panel assembly 128 to sleeper truck cab 102. Reinforcement members 138, 140, 146, 148 may have, e.g., a section such as an I-section, a U section, an L-section, a box section, and a hat section, as shown in FIGS. 6A–6C. A surround panel 166 may be, e.g., welded to closeoff panel 128 to facilitate rear window installation.

A gasket 156 is shown interposed between closeoff panel assembly 128 and rearward end 118 in FIG. 3. Gasket 156 may be, e.g. a compression seal, a rubber gasket, a cork gasket, a plastic gasket, an adhesive gasket, or a silicone gasket. Gasket 156 may further include e.g. an adhesive as a part of the seal or as a separate seal.

In a second embodiment, a method of converting a modular truck sleeper/cab 100 to a day cab 162 comprises the steps of i) providing a modular truck sleeper/cab 100 having a modular sleeper 104 fastened to a rearward end 118 of a sleeper truck cab 102 with a first plurality of fasteners 158 at a plurality of predetermined locations 126, ii) removing first plurality of fasteners 158 which connect modular sleeper 104 to sleeper truck cab 102, iii) removing modular sleeper 104 from sleeper truck cab 102 thereby creating a rearward opening 160 at rearward end 118 of sleeper truck cab 102, iv) providing a closeoff panel assembly 128 to close rearward opening 160 created by removal of modular sleeper 104 from sleeper truck cab 102, v) applying a gasket 156 to rearward end 118, vi) fastening closeoff panel assembly 128 to sleeper truck cab 102 with a second plurality of fasteners 134 in at least some of the plurality of predetermined locations 126 to close rearward opening 160 whereby sleeper truck cab 102 has appearance of a day cab 162, vii) connecting closeoff panel assembly 128 to B-pillars 114 and 116 of sleeper truck cab 102 with a first and second reinforcement members 138 and 140, viii) connecting closeoff panel assembly 128 to a rear sill of modular sleeper truck cab 102 with a third and fourth reinforcement members 146 and 148, and ix) distributing a load from closeoff panel assembly 128 to modular sleeper truck cab 102 with reinforcement members 138, 140, 146, and 148.

In a fourth embodiment, the step of v) applying a gasket 156 to rearward end 118 further comprises the steps of, x) bonding a gasket 156 to closeoff panel assembly 128, xi) aligning closeoff panel assembly 128 with rearward opening 160, and xii) fastening sleeper truck cab 102 and closeoff panel assembly 128 together such that gasket 156 forms a compression seal.

In an alternative embodiment, the step of v) applying a gasket 156 to rearward end 118 further comprises the steps of, x) applying an adhesive sealant to an exterior surface of gasket 156, thereby substantially sealing an interface between rearward end 118 and closeoff panel assembly 128 against moisture.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A conversion kit assembly for converting a modular truck sleeper/cab to a day cab, comprising:

a sleeper truck cab comprising a lower member, two laterally spaced walls, and a roof, each of said walls comprising a B-pillar assembly at a rearward end of said sleeper truck cab, said B-pillars being coupled together at upper ends thereof by said roof, and at lower ends by said lower member, such that said rearward end of said sleeper truck cab is substantially square, said sleeper truck cab having a plurality of attachment points at said rearward end for attaching a modular sleeper;

a closeoff panel assembly comprising: a top opposing a bottom, and two opposing and laterally spaced sides, said closeoff panel assembly further comprising a frame sub-assembly and an outer panel weldably disposed on said frame sub-assembly, said sub-assembly being substantially arranged around a perimeter of said outer panel, and comprising a bottom frame sub-assembly member attached to a bottom of said outer panel and extending along the bottom of the closeoff panel assembly, said frame sub-assembly further comprising: a first substantially horizontal reinforcement extending between said opposing sides of said closeoff panel assembly, and at least two second support members extending between the first substantially horizontal reinforcement and the bottom frame sub-assembly member, said closeoff panel assembly being attached to said sleeper truck cab by fasteners disposed at locations corresponding to at least some of said plurality of attachment points;

first and second reinforcement members each having a first end fixedly attached to said closeoff panel assembly and a second end fixedly attached to one of said B-pillar assemblies of said sleeper truck cab;

third and fourth reinforcement members each having a first end fixedly attached to said closeoff panel assembly and a second end fixedly attached to said lower member of said sleeper truck cab;

wherein said reinforcement members distribute a load from said closeoff panel assembly to said sleeper truck cab.

2. The conversion kit assembly of claim 1, wherein said lower member is selected from the group consisting of:
   a lower panel, and
   a rear sill.

3. The conversion kit assembly of claim 1, wherein said fastener is selected from the group consisting of:
   a bolt;
   a clip;
   a rivet; and
   a screw.

4. The conversion kit assembly of claim 3, wherein said fastener comprises further a component selected from the group consisting of:
   a rivetnut,
   a washer,
   a spacer, and
   a shim.

5. The conversion kit assembly of claim 1, wherein said closeoff panel comprises further a window opening.

6. The conversion kit assembly of claim 5, wherein said frame sub-assembly comprises further reinforcement members arranged around a perimeter of the window opening.

7. The conversion kit assembly of claim 1, comprising further a gasket substantially interposed between said closeoff panel assembly and said rearward end.

8. The conversion kit assembly of claim 7, wherein said gasket is selected from the group consisting of:
   a compression seal,
   a rubber gasket,
   a cork gasket,
   a plastic gasket,
   an adhesive gasket, and
   a silicone gasket.

9. The conversion kit assembly of claim 1, wherein said reinforcement members have a section selected from the group consisting of:
   an I-section,
   a U section,
   an L-section,
   a box section, and
   a hat section.

10. The conversion kit assembly of claim 1, wherein said frame sub-assembly substantially triangulates said closeoff panel assembly.

11. The conversion kit assembly of claim 1, wherein said frame sub-assembly is arranged substantially around a perimeter of said closeoff panel.

12. The conversion kit assembly of claim 1, wherein said second support members extend diagonally between the first substantially horizontal reinforcement and the bottom frame sub-assembly member.

13. A method of converting a modular truck sleeper/cab to a day cab, comprising the steps of:
   providing a modular truck sleeper/cab having a modular sleeper fastened to a rearward end of a sleeper truck cab with a first plurality of fasteners at a plurality of predetermined locations;
   removing said first plurality of fasteners, which connect said modular sleeper to said sleeper truck cab;
   removing said modular sleeper from said sleeper truck cab thereby creating a rearward opening at said rearward end of said sleeper truck cab;
   providing a closeoff panel assembly to close said rearward opening created by said removal of said modular sleeper from said sleeper truck cab, wherein said closeoff panel assembly comprises: a top opposing a bottom, and two opposing and laterally spaced sides, said closeoff panel assembly further comprising a frame sub-assembly and an outer panel weldably disposed on said frame sub-assembly, said frame, sub-assembly being substantially arranged around a perimeter of said outer panel, and comprising a bottom frame sub-assembly member attached to a bottom of said outer panel and extending along the bottom of the closeoff panel assembly, said frame sub-assembly further comprising: a first substantially horizontal reinforcement extending between said opposing sides of said closeoff panel assembly, and at least two second support members extending between the first substantially horizontal reinforcement and the bottom frame sub-assembly member, said closeoff panel assembly being attached to said sleeper truck cab by fasteners disposed at locations corresponding to at least some of said plurality of attachment points;
   fastening said closeoff panel assembly to said sleeper truck cab with a second plurality of fasteners in said plurality of predetermined locations to close said rearward opening whereby said sleeper truck cab has said appearance of a day cab;
   connecting said closeoff panel assembly to B-pillar assemblies of said sleeper truck cab with a first and second reinforcement members;
   connecting said closeoff panel assembly to a lower member of said sleeper truck cab with a third and fourth reinforcement members; and
   distributing a load from said closeoff panel assembly to said sleeper truck cab with said reinforcement members.

14. The method of converting a modular truck sleeper/cab to a day cab of claim 12, wherein said lower member is selected from the group consisting of:
   a lower panel, and
   a rear sill.

15. The method of converting a modular truck sleeper/cab to a day cab of claim 13, further comprising the steps of:

bonding a gasket to said rearward end;

aligning said closeoff panel assembly with said rearward opening; and fastening said sleeper truck cab and said closeoff panel assembly together such that said gasket forms a compression seal.

16. The method of converting a modular truck sleeper/cab to a day cab of claim 15, further comprising the step of:

applying an adhesive sealant to an exterior surface of said gasket, thereby substantially sealing an interface between said rearward end and said closeoff panel assembly against moisture.

17. The method of converting a modular truck sleeper/cab to a day cab of claim 13, herein said gasket is selected from the group consisting of:

a compression seal, a rubber gasket, a cork gasket, a plastic gasket, an adhesive gasket, and a silicone gasket.

18. The method of converting a modular truck sleeper/cab to a day cab of claim 13, further comprising the steps of:

bonding a gasket to said closeoff panel assembly;

aligning said closeoff panel assembly with said rearward opening; and fastening said sleeper truck cab and said closeoff panel assembly together such that said gasket forms a compression seal.

19. The method of converting a modular truck sleeper/cab to a day cab of claim 18, further comprising the step of:

applying an adhesive sealant to an exterior surface of said gasket, thereby substantially sealing an interface between said rearward end and said closeoff panel assembly against moisture.

20. The method of converting a modular truck sleeper/cab to a day cab of claim 18, wherein said gasket is selected from the group consisting of:

a compression seal, a rubber gasket, an adhesive gasket, and a silicone gasket.

21. The method of converting a modular truck sleeper/cab to a day cab of claim 13, wherein said fastener is selected from the group consisting of:

a bolt;

a clip;

a rivet; and a screw.

22. The method of converting a modular truck sleeper/cab to a day cab of claim 21, wherein said fastener comprises further a component selected from the group consisting of:

a rivetnut, a washer, a spacer, and a shim.

23. The method of converting a modular truck sleeper/cab to a day cab of claim 13, wherein said second support members extend diagonally between the first substantially horizontal reinforcement and the bottom frame subassembly member.

* * * * *